United States Patent [19]
Morimoto

[11] Patent Number: 5,682,141
[45] Date of Patent: Oct. 28, 1997

[54] UNDERGROUND OBJECT INDICATING DEVICE

[76] Inventor: Shigeo Morimoto, 13-11, Onodai 1-chome, Osakasayama-shi, Osaka, Japan

[21] Appl. No.: 561,313

[22] Filed: Nov. 21, 1995

[30] Foreign Application Priority Data

Jun. 5, 1995 [JP] Japan ................... 7-138056

[51] Int. Cl.$^6$ ................... G03B 13/18
[52] U.S. Cl. ............ 340/552; 340/572; 340/540; 324/326
[58] Field of Search ................ 340/572, 551, 340/552, 540, 635; 333/123, 243; 324/326, 327, 328, 329, 67

[56] References Cited

U.S. PATENT DOCUMENTS

| | | | |
|---|---|---|---|
| 3,665,511 | 5/1972 | Wolf | 340/540 |
| 4,438,389 | 3/1984 | De Sa | 324/52 |
| 4,573,016 | 2/1986 | Nakamura et al. | 324/326 |
| 4,573,829 | 3/1986 | Keene et al. | 405/157 |
| 4,652,861 | 3/1987 | Domes | 340/539 |
| 5,151,657 | 9/1992 | Taskjian | 324/326 |
| 5,557,258 | 9/1996 | Eslambolchi | 340/540 |

FOREIGN PATENT DOCUMENTS 2-114275  9/1990  Japan .
5-32703  8/1993  Japan .

*Primary Examiner*—Jeffery Hofsass
*Assistant Examiner*—Benjamin C. Lee
*Attorney, Agent, or Firm*—Wenderoth, Lind & Ponack

[57] ABSTRACT

An underground object indicating device includes a longitudinal sheet material to be buried along and above an underground object. A locator cable is mounted on an upper surface of the sheet material. The locator cable includes a strand of metal wires having high conductivity and a flexible conductive sheath covering the entire length of the metal wire strand.

13 Claims, 5 Drawing Sheets

UNDERGROUND OBJECT INDICATING DEVICE

BACKGROUND OF THE INVENTION

The present invention relates to an underground object indicating device to be buried at a position intermediate between the ground surface and an existing underground object, such as an electrical cable, a water supply pipe, a gas supply pipe, or a telecommunication line, for indicating the existence of such underground object, particularly when an excavation operation is to be conducted subsequently, and more particularly to such an underground object indicating device having a locator cable capable of being detected by a detector at the ground surface.

Such underground object indicating devices are known, e.g. as disclosed in Japanese Utility Model Publications 2-114275 (1990) and 5-32703 (1993). Each such known underground object indicating device includes a sheet to be buried in the ground and a conductor, e.g. a single wire or cable or a metal strip, joined to the sheet. The conductor joined to the sheet may be coated with a protective layer.

Such underground object indicating sheets accompanied with conductors that act as locators are used by being buried at an intermediate location between the ground surface and an existing underground electrical cable, water supply pipe, gas supply pipe, telecommunication line, or other conduit. Prior to starting a subsequent excavation operation in the area of the underground object indicating device, an end of the conductor that is exposed at the ground surface is connected to a power supply. As a result, the conductor in the ground produces a magnetic field which then is detected by a detector at the ground surface. Thereby, the location of the existing underground object easily is identified.

When the overall length of such known underground object indicating device is identical to that of the underground object, its locator function will work well. However, if the known underground object indicating device is shorter in length than the underground object or if such underground object is divided into branches, two or more of the indicating devices have to be joined to one another in a manner to ensure good conductivity therebetween. Before being joined, the respective conductors are exposed by removing the protective coating from adjacent ends thereof. This removal operation takes a considerable length of time and involves considerable cost, thus reducing efficiency of an installation operation. Also, the joined ends of the conductors remain exposed and are susceptible to chemical corrosion and may become disconnected. Therefore, such known indicating devices have low reliability.

SUMMARY OF THE INVENTION

It is an object of the present invention, in view of the above prior art disadvantages, to provide an improved underground object indicating device with locator function which is capable of being joined with ease to another such device, thereby increasing efficiency of installation, and producing a joint having enhanced durability.

This object is achieved according to the present invention by provision of an underground object indicating device with locator function including a sheet material to be buried along and above an underground object and a locator cable mounted to an upper surface of the sheet material. The locator cable includes a strand of metal wires having high conductivity and a flexible conductive sheath covering the entire length of the metal wire strand. The flexible conductive sheath of the locator cable may be made of a conductive rubber or a synthetic soft resin material and attached to the upper surface of the sheet material by an adhesive agent, an adhesive tape, or by fusing.

In use, the underground object indicating device of the present invention is placed at an intermediate position between the ground surface and the underground object so that it extends along the underground object. If the buried underground object has a length greater than the length of the underground object indicating device or is separated into branches, two or more of the underground object indicating devices are joined to one another by knotting ends of the locator cables thereof. When the joined underground object indicating devices have been covered with excavated soil, conductivity is continuous therebetween.

BRIEF DESCRIPTION OF THE DRAWINGS

Preferred embodiments of an underground object indicating device with locator function according to the present invention now will be described with reference to the accompanying drawings, wherein.

DETAILED DESCRIPTION OF PREFERRED EMBODIMENTS

Figure 1:
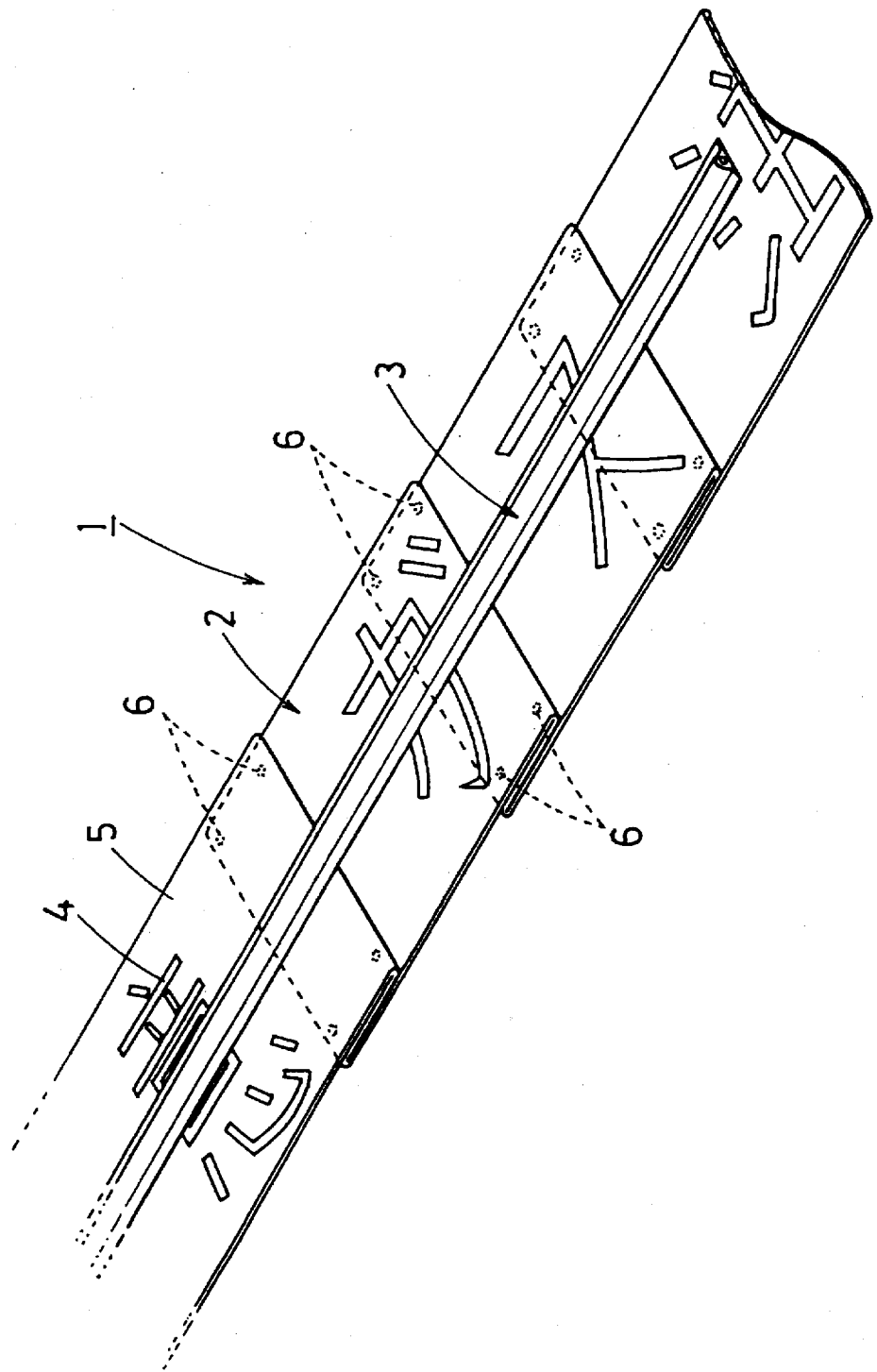
FIG. 1 is a perspective view of an underground object indicating device with locator function according to one embodiment of the present invention.

FIG. 1 is a perspective view of an underground object indicating device 1 with locator function, i.e. having the capability of being used to detect the location of an underground object. Device 1 includes an indicating sheet 2, shown as being folded to overlap at positions spaced in the lengthwise direction of the sheet, and a locator cable 3 bonded to an upper surface of the indicating sheet 2. The indicating sheet 2 may be similar to those disclosed in Japanese Utility Model Publications 50-5209 (1975) and 3-31909 (1991) and is fabricated by coating opposite sides of laminations of a polyethylene material of filament fibers on which a marking 4 including a type of the underground object, words of a notice, and the name and telephone number of an installer is printed, and cutting such material into a length of tape 5. The tape 5 is folded by doubling it upon itself and the overlapped regions are fastened by fusing at spots 6. The locator cable 3 is then joined to the upper surface of the tape 5, after which the device may be rolled up for storage.

Figure 2:
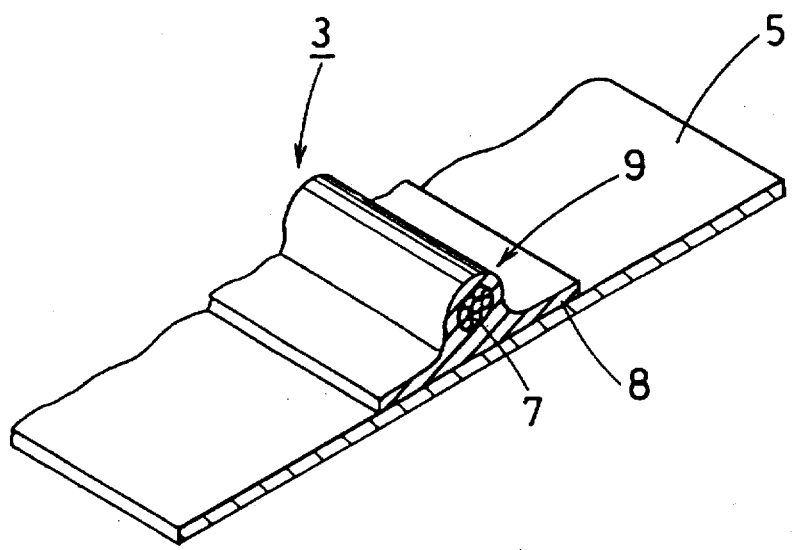
FIG. 2 is a perspective view showing a strand of metal wires and a flexible conductive sheath covering the entire length of the metal wire strand of the underground object indicating device of the embodiment of FIG. 1.

As shown in FIG. 2, the locator cable 3 joined to the tape 5/sheet 2 comprises a strand of metal wires 7 made of a conductor such as a copper material, and a sheath 9 of resilient conductive material and covering the metal wires 7. Sheath 9 has a flattened or $\Omega$ shape in cross section with a flat bottom mounting portion 8. The locator cable 3 is joined by bonding the bottom mounting portion 8 of sheath 9 by a proper adhesive (not shown) to the upper surface of the tape 5. The resilient, conductive sheath 9 may be formed of rubber or a polymer mixed with a powder of metal, or conductive fiber or resin made by subjecting an acrylic fiber to a reducing solution containing hydrosulfate or its equivalent.

Figure 3:
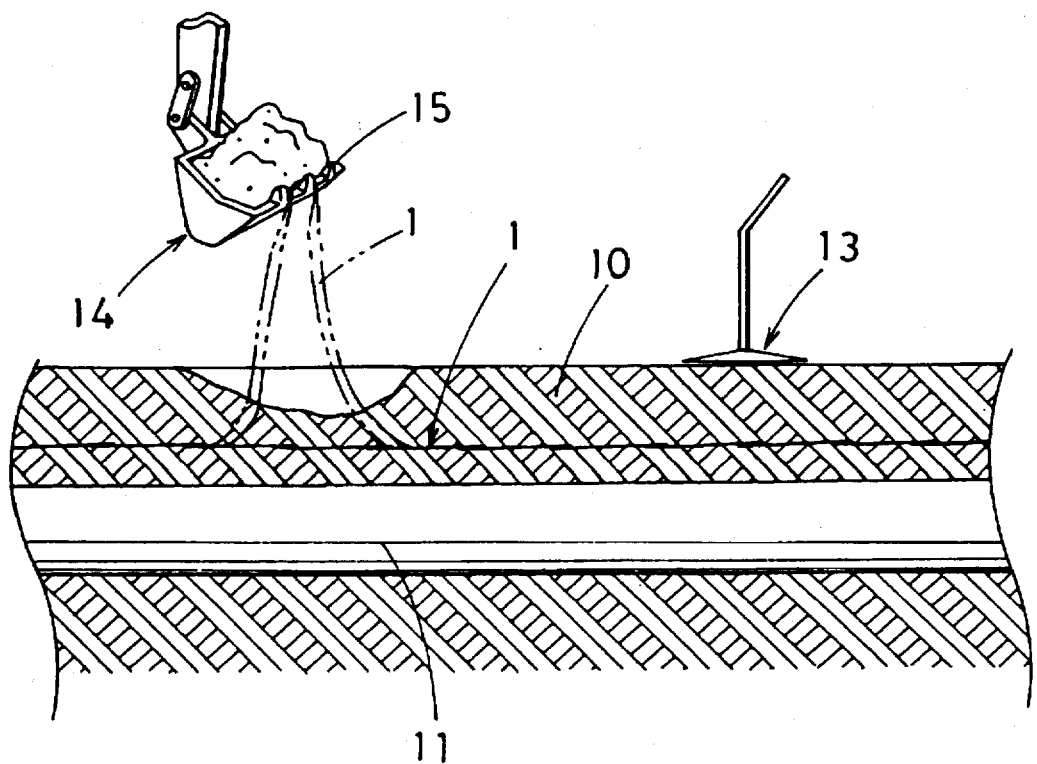
FIG. 3 is a longitudinal cross sectional view showing an excavating operation.
Figure 4:
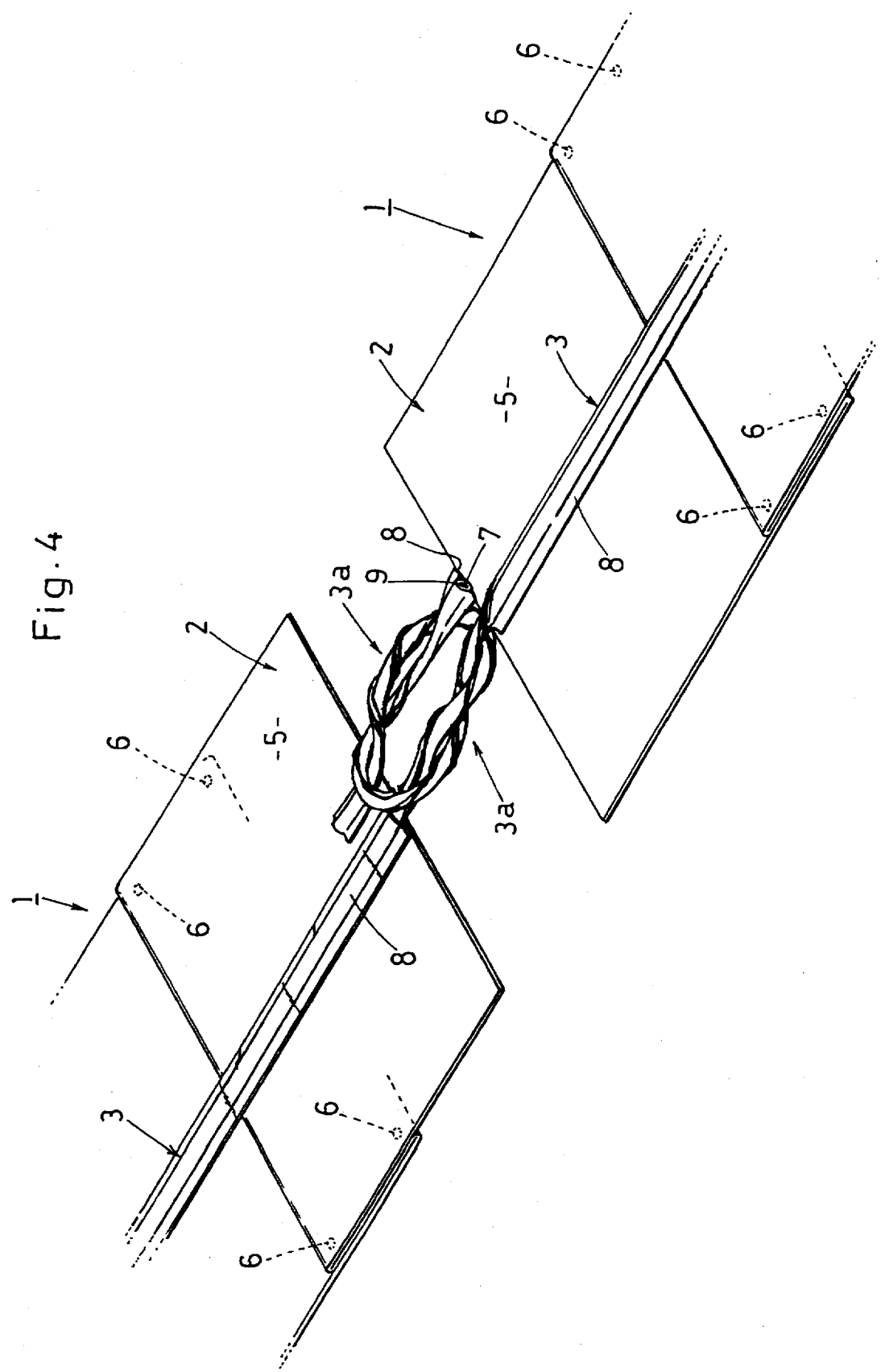
FIG. 4 is a perspective view showing a joint between two underground object indicating devices of the embodiment of FIG. 1.

Installation of the underground object indicating device 1 now will be described in detail with reference to FIG. 3. After an object, for example a gas conduit 11, is placed at a given depth in ground 10, excavated soil is returned to half of the depth of excavation, as shown in FIG. 3. Then, the underground object indicating device 1 is placed above and along the gas conduit 11. If the length of gas conduit 11 in the ground 10 is greater than the length of the underground object indicating device 1, or if the gas conduit has separate branches, then two or more of the underground object indicating devices 1 have to be joined together while ensuring conductivity therebetween. Two adjacent underground object indicating devices 1 are joined to each other by twisting or knotting together ends 3a of the two locator cables 3, as shown in FIG. 4. Then, the series of the underground object indicating devices 1 are covered with soil to finish refilling of the excavation. Since the series or chain of the locator cables 3 of the respective underground object indicating devices 1 are connected to one another at their ends 3a, the respective conductive sheaths 9 are in contact and ensure continuous conductivity therebetween.

When an excavating operation subsequently is needed at the same location, for example for installation of another object such as an electrical cable, a sewage conduit, etc., the strand of metal wires 7 is connected to a power supply for thus producing a magnetic field. As shown in FIG. 3, such magnetic field may be detected by a sensor 13. Thus, the location of the buried gas conduit 11 is identified without difficulty. If excavation at the location is conducted, for example by a power backhoe 14, without preparatory examination with the sensor 13, the underground object indicating device 1 prevents digging therebelow of the power backhoe 14. Particularly, the underground object indicating device 1 will be hooked by claws 15 of the power backhoe 14 and such occurrence will be observed. The underground object indicating device 1 displays its printed marking of relevant information including type of underground object and the name and telephone number of installer. Thus, an operator of the power backhoe 14 can stop excavation and consult the installer. As a result, damage to the buried gas conduit 11 will be avoided.

Figure 5:
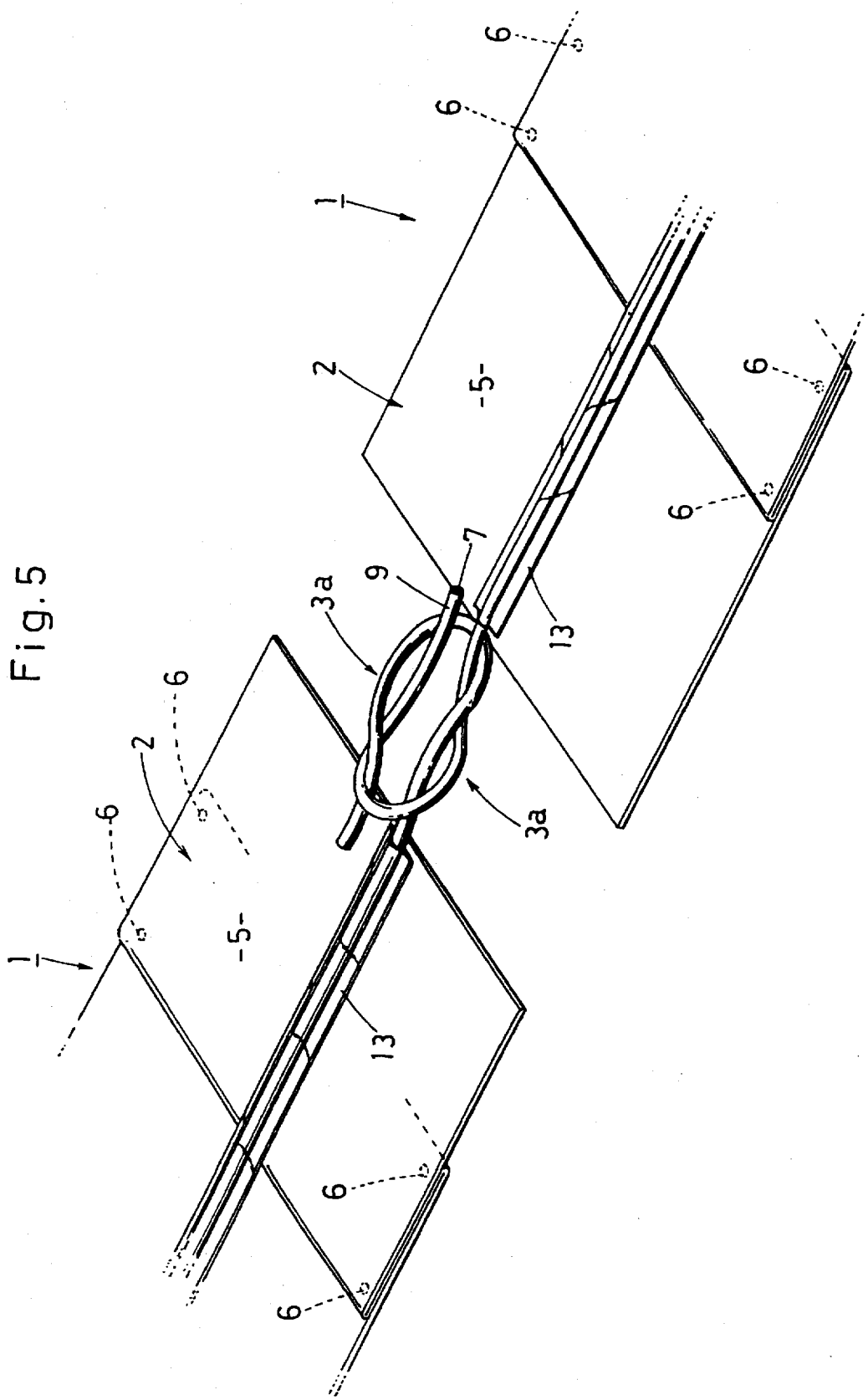
FIG. 5 is a perspective view showing a joint between two underground object indicating devices with locator function of another embodiment of the present invention.

FIG. 5 illustrates another embodiment of the present invention that is similar to the above embodiment, except that the sheath 9, enclosing a strand of metal wires 7 made of a conductor such as a copper material to form locator cable 3, is a resilient conductive material having a tubular shape. The locator cable 3 is joined to the indicating sheet 2 by bonding the tubular sheath 9 to sheet 2 by adhesive tape 13. To join two adjacent underground object indicating devices 1 of this embodiment, ends 3a of the two locator cables are connected to each other by twisting or knotting after a desired length of the adhesive tape 13 is removed, as shown in FIG. 5. Such knotted sheaths 9 thus are in contact to ensure continuous continuity therebetween. The joint may be protected with a length of the adhesive tape 13. Functioning of this embodiment is identical to the previous embodiment.

Figure 6:
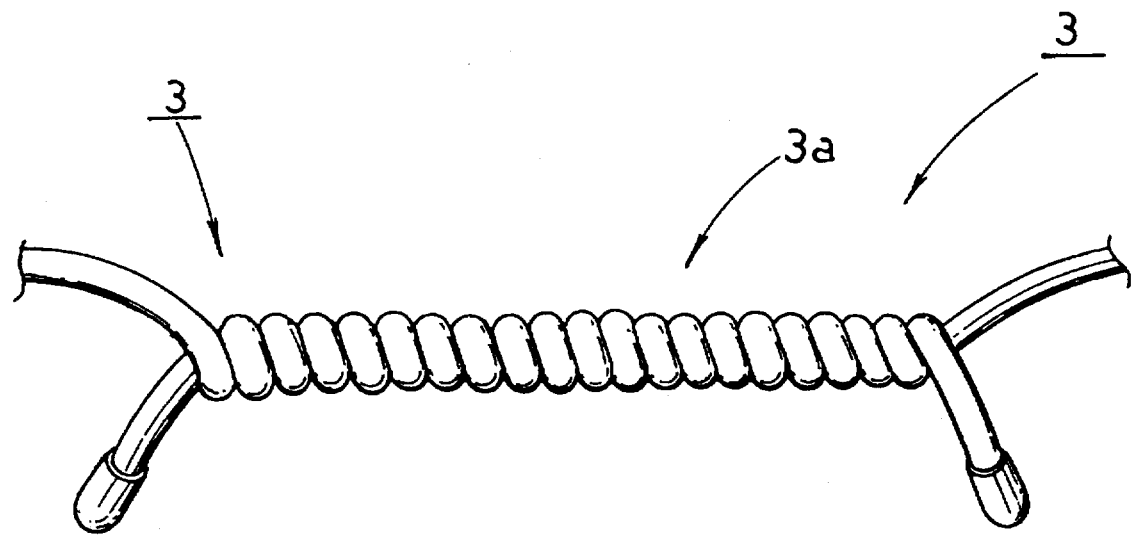
FIG. 6 is a front view showing a modification of the joint.

It is to be understood that the method of joining two sheaths 9 of respective locator cables 3 is not limited to that explained in the previous embodiments. The two locator cables may be joined to each other by simply winding as shown in FIG. 6 or by any other similar fastening manner.

What is claimed is:

1. An underground object indicating device to be used to detect the location of an underground object by being buried to extend along and be spaced above such object, said device comprising:

a length of flat sheet material having opposite surfaces;

a locator cable including a strand of metal wires having high conductivity and a flexible conductive sheath covering the entire length of said strand of metal wires; and said locator cable being mounted on one said surface of said length of sheet material that is to be an upper surface thereof upon said device being buried to extend along and be spaced above the object and to provide an indication of the location thereof.

2. A device as claimed in claim 1, wherein said sheath is made of a conductive rubber or soft synthetic resin material.

3. A device as claimed in claim 1, wherein said locator cable is attached to said upper surface of said length of sheet material by an adhesive agent, an adhesive tape or by fusing.

4. A device as claimed in claim 1, wherein said sheath has a flattened shape defining a flat bottom mounting portion attached to said upper surface of said length of sheet material.

5. A device as claimed in claim 1, wherein said sheath has a tubular shape.

6. An assembly of at least two underground indicating devices to be used to detect the location of an underground object by being buried to extend along and be spaced above such object, said assembly comprising:

each said device including a length of flat sheet material having opposite surfaces, a locator cable including a strand of metal wires having high conductivity and a flexible conductive sheath covering the entire length of said strand of metal wires, and said locator cable being mounted on one said surface of said length of sheet material that is to be an upper surface thereof upon said device being buried to extend along and be spaced above the object and to provide an indication of the location thereof; and said devices being joined by connecting adjacent ends of respective said sheaths of said devices, such that the thus connected sheaths provide continuity of conductivity between the thus joined said devices.

7. An assembly as claimed in claim 6, wherein each said sheath is made of a conductive rubber or soft synthetic resin material.

8. An assembly as claimed in claim 6, wherein each said locator cable is attached to said upper surface of the respective said length of sheet material by an adhesive agent, an adhesive tape or by fusing.

9. An assembly as claimed in claim 6, wherein each said sheath has a flattened shape defining a flat bottom mounting portion attached to said upper surface of the respective said length of sheet material.

10. An assembly as claimed in claim 6, wherein each said sheath has a tubular shape.

11. An assembly as claimed in claim 6, wherein said ends of said sheaths are knotted together.

12. An assembly as claimed in claim 6, wherein said ends of said sheaths are twisted together.

13. An assembly as claimed in claim 6, wherein said ends of said sheaths are wound together.

* * * * *